(12) United States Patent
Kong et al.

(10) Patent No.: US 8,113,809 B2
(45) Date of Patent: Feb. 14, 2012

(54) LOCALIZED OVER-MOLDING DIE STRUCTURE

(75) Inventors: Byung Seok Kong, Seoul (KR); Jin-Wan Park, Suwon-si (KR)

(73) Assignees: Hyundai Motor Company, Seoul (KR); Kia Motors Corporation, Seoul (KR); Duckyang Ind. Co. Ltd., Ulsan (KR)

( * ) Notice: Subject to any disclaimer, the term of this patent is extended or adjusted under 35 U.S.C. 154(b) by 48 days.

(21) Appl. No.: 12/832,775

(22) Filed: Jul. 8, 2010

(65) Prior Publication Data

US 2011/0123667 A1 May 26, 2011

(30) Foreign Application Priority Data

Nov. 20, 2009 (KR) .................. 10-2009-0112543

(51) Int. Cl.
*B29C 45/44* (2006.01)

(52) U.S. Cl. ............... 425/130; 264/328.7; 264/328.8; 425/DIG. 58

(58) Field of Classification Search .......... 425/130, 425/133.1, DIG. 58; 264/328.7, 328.8
See application file for complete search history.

(56) References Cited

U.S. PATENT DOCUMENTS

| | | | | |
|---|---|---|---|---|
| 5,094,602 A | * | 3/1992 | Morita | 425/130 |
| 5,746,965 A | * | 5/1998 | Sorensen et al. | 425/438 |
| 5,846,473 A | * | 12/1998 | Sorensen et al. | 425/556 |
| 2007/0264474 A1 | * | 11/2007 | Filipp et al. | 425/130 |

FOREIGN PATENT DOCUMENTS

| | | |
|---|---|---|
| JP | 1-135616 A | 5/1989 |
| JP | 1-135617 A | 5/1989 |
| JP | 2004-306295 A | 11/2004 |
| KR | 2003-0084836 A | 11/2003 |
| KR | 10-0752229 B1 | 8/2007 |

* cited by examiner

*Primary Examiner* — Timothy Heitbrink
(74) *Attorney, Agent, or Firm* — Morgan, Lewis & Bockius LLP

(57) ABSTRACT

A localized over-molding die structure may include a core die, a cavity die having an inner space therein and placed onto an upper surface of the core die, and a slide die including a step portion on a lower surface thereof and slidably engaged with the cavity die in the inner space thereof to move upward and downward, wherein, the step portion includes an undercut formed at a lateral side thereof such that when at least two materials are successively injected into the cavity die, a corresponding part to the undercut is formed to at least one of the at least two materials.

3 Claims, 9 Drawing Sheets

LOCALIZED OVER-MOLDING DIE STRUCTURE

CROSS-REFERENCE TO RELATED APPLICATION

The present application claims priority to Korean Patent Application Number 10-2009-0112543, filed on Nov. 20, 2009, the entire contents of which is incorporated herein for all purposes by this reference.

BACKGROUND OF THE INVENTION

1. Field of the Invention

The present invention relates to a localized over-molding die structure, and more particularly, to a localized over-molding die structure, wherein it is possible to prevent from an existing circumstance (hereinafter, it is referred to an 'overflow') that an injection resin flows over at the material boundary when a localized over-molding process proceeds 2. Description of Prior Art In general, a localized over-molding means a mold for embodying the tone of color, the quality of the material, the sense of touch or the like, by injecting each of two materials in only a mold in a localized area.

When the localized over-molding is performed, the width of the second injection part and the position of a gate may be various with every production, and accordingly, a pressure on the material boundary may be different.

Commonly, when the width of the second injection part becomes large, the pressure for filling up all of the width becomes large, and a deviation of the pressure according to the position of the material boundary becomes large as well.

In order to overcome a problem that an overflow occurs in the material boundary with an excessive pressure, a simple groove was formed in the prior art, but, in case of this, when the width of the second injection part becomes large, the overflow occurred still, and there was a limit to improve the injection pressure for the second molding.

That is, since there was a limit to improve the injection pressure in a prior section of the material boundary, there are restricted in the width and the thickness of the second injection part, and accordingly, there was a problem that a degree of freedom in a design becomes worse.

FIGS. 1A to 1D are section-views showing an over-molding process in the conventional localized over-molding die structure, respectively, and more particularly, section-views showing an over-molding process for a large sized component.

As shown in FIGS. 1A to 1D, the localized over-molding die structure according to the prior art includes, a core die 10 arranged in a lower side; a cavity die 30 arranged in a upper side; and a slide die 50 for moving upward and downward at in the inner space 35 of the cavity die 30, wherein, the first gate 100 and the second gate 200 are arranged in the side part of the cavity die 30 in order to inject an injection resin into the inside part of the cavity die 30, respectively.

In the localized over-molding die structure, by lifting forcibly up the slide die 50 after the first injection is performed, the slide die 50 may play a role in securing a defined space on the upper side of the first injection material 110 so that the second injection is performed.

Now, a localized over-molding process will be explained referring to FIGS. 1A to 1D.

First, by injecting a resin through the first gate 100, the first injection material 110 is formed (referring to FIG. 1A). Next, by lifting up the slide die 50, an inner space is formed on the upper side of the first injection material 110 (referring to FIG. 1B), and then, by injecting other resin through the second gate 200, the second injection material 210 is formed on the upper side of the first injection material 110 (referring to FIG. 1C).

Here, in the boundary between two materials on which both of the first injection material 110 and the second injection material 210 are formed, it was known that the overflow resin 230 may remain (referring to FIG. 1D).

On the other hand, FIG. 2 is a view illustrating a practical aspect which an overflow is formed in a process of the conventional localized over-molding.

As shown in FIG. 2, it was known that an overflow resin 230 is protruded through a gap in the boundary between two materials.

FIG. 3 is an enlarged view for enlarging "A" part of FIG. 1D for explaining a cause which an overflow occurs in the conventional localized over-molding die structure.

In the localized over-molding die structure, there are some reasons why the overflow is formed, as follows.

Firstly, by means of the second injection pressure (a process of FIG. 1C) which is applied during a process before the first injection material 110 is completely cooled, the first injection material 110 is shoved, and accordingly, a gap between the first injection material 110 and the slide die 50 is formed (in case of (a) in FIG. 3).

Secondly, the cavity die 30 may be shoved by forming a gap between the cavity die 30 and the slide die 50, and a gap may be generated by heat distortion of the mold. Besides, by setting an incline (of about 1 degree) between the side mold 50 and the first injection material 110, a gap at the junction part may be formed (in case of (b) in FIG. 3).

According to the localized over-molding die structure of the prior art, the overflow may inevitably occur at the localized boundary of two materials by the above-described reasons, and accordingly, the problems may occur that a yield of the products in the manufacturing process is depreciated and the quality of the vehicle appearance is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a localized over-molding die structure, wherein, by forming an undercut at the side on a step part of a slide die, when the slide die for the second injection is receded, an adhesion is applied by the interference between the first injection material and the slide die so that a forced sealing area may be formed, and accordingly, it is possible to prevent from an overflow at the localized boundary of two materials.

In an aspect of the present invention, the localized over-molding die structure may include a core die; a cavity die having an inner space therein and placed onto an upper surface of the core die; and a slide die including a step portion on a lower surface thereof and slidably engaged with the cavity die in the inner space thereof to move upward and downward, wherein, the step portion includes an undercut formed at a lateral side thereof such that when at least two materials are successively injected into the cavity die, a corresponding part to the undercut is formed to at least one of the at least two materials.

The undercut may be formed to be a shape which is recessed with a slanted angle from a lower vertical surface of the step portion.

A maximal line length ($\alpha$) of the undercut may be between approximately 0.2 mm and approximately 0.4 mm.

According to the localized over-molding die structure of the present invention, it is possible to overcome fundamentally the overflow at the localized boundary of two materials, and to stabilize injection conditions for filling up the second injection material.

By improving a degree of freedom which relates to a design and a performance such as the width and thickness of the second injection part and the like, a localized over-molding process of the present invention is also applicable to built-in parts of a vehicle in which the width of the second injection part is excessive, and accordingly, the quality of the vehicle appearance may be improved, and a yield of the products in the manufacturing process may be increased in order to decrease a manufacturing cost of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
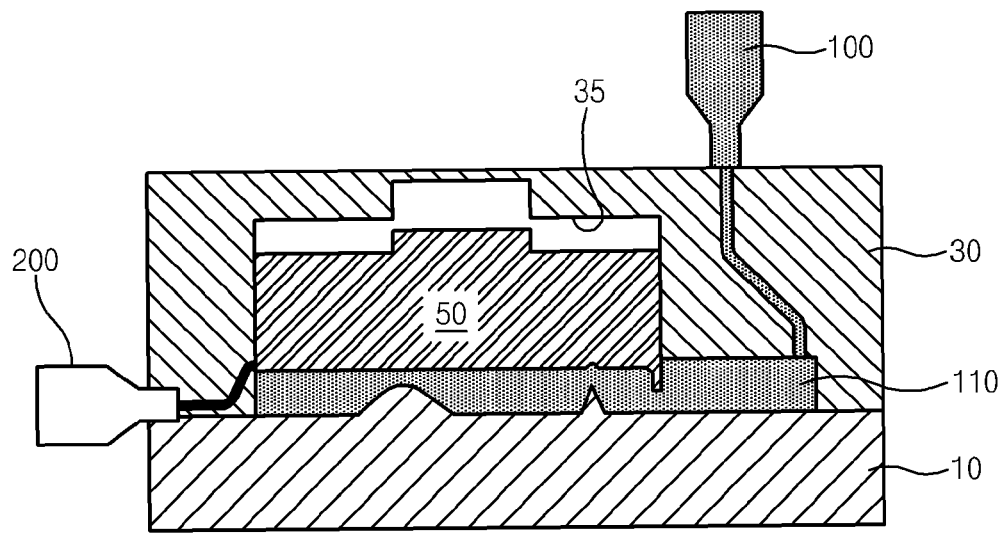
FIGS. 1A to 1D are section-views showing an over-molding process in the conventional localized over-molding die structure, respectively.
Figure 1B:
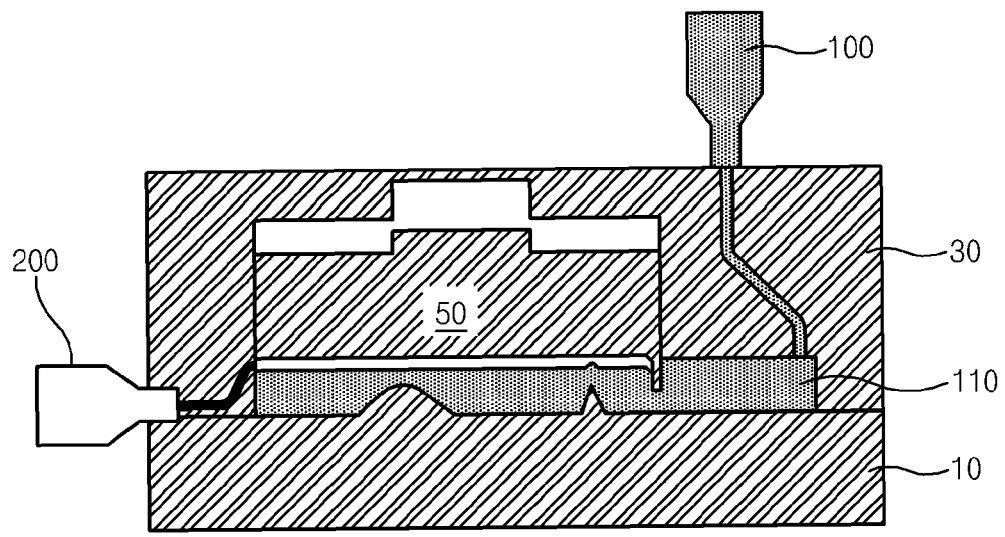
Figure 1C:
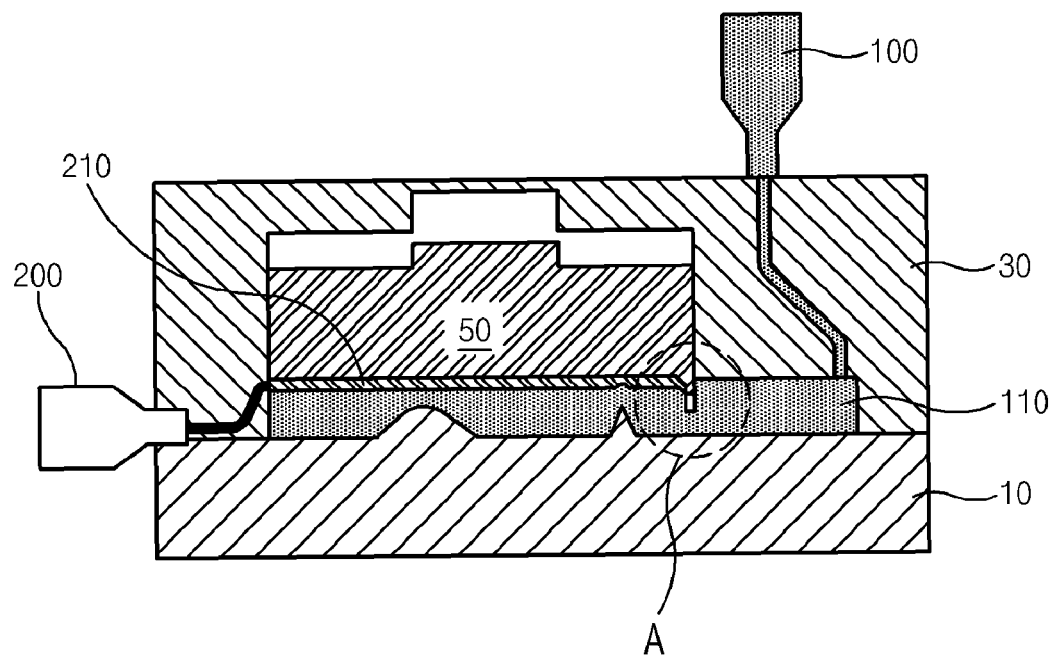
Figure 1D:
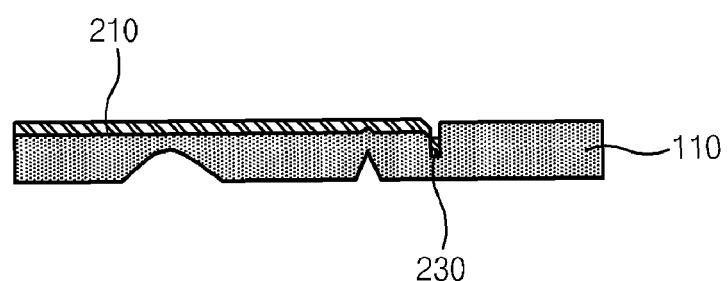
Figure 2:
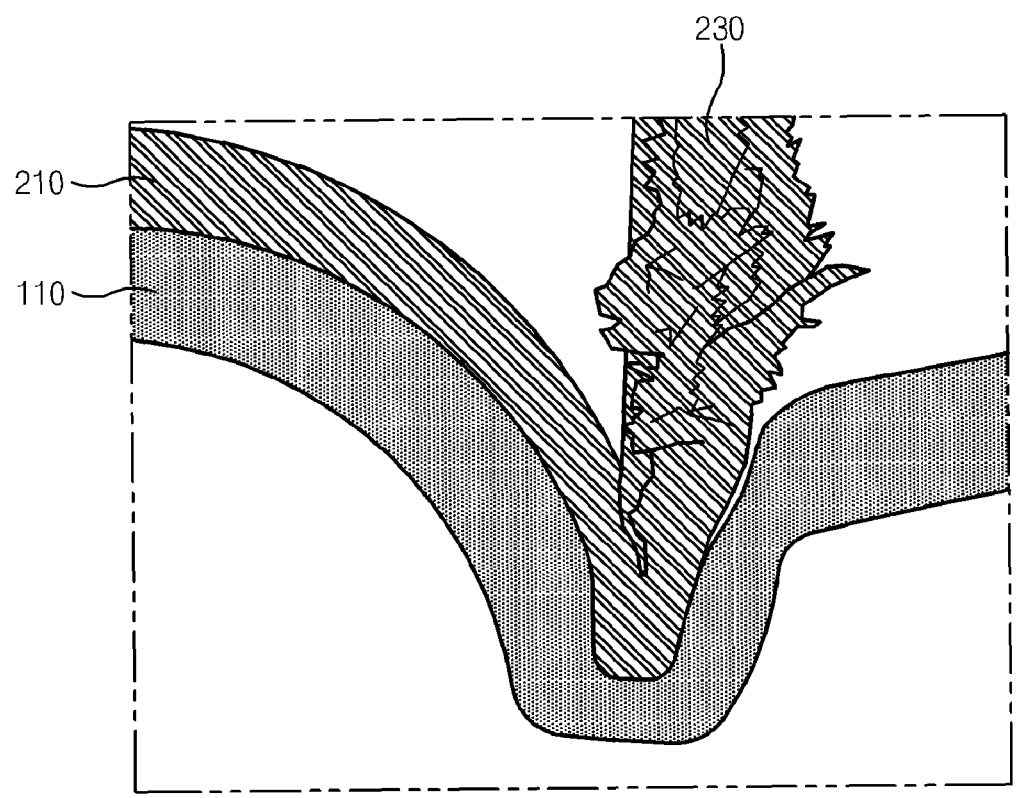
FIG. 2 is a view illustrating a practical aspect which an overflow is formed in a process of the conventional localized over-molding.
Figure 3:
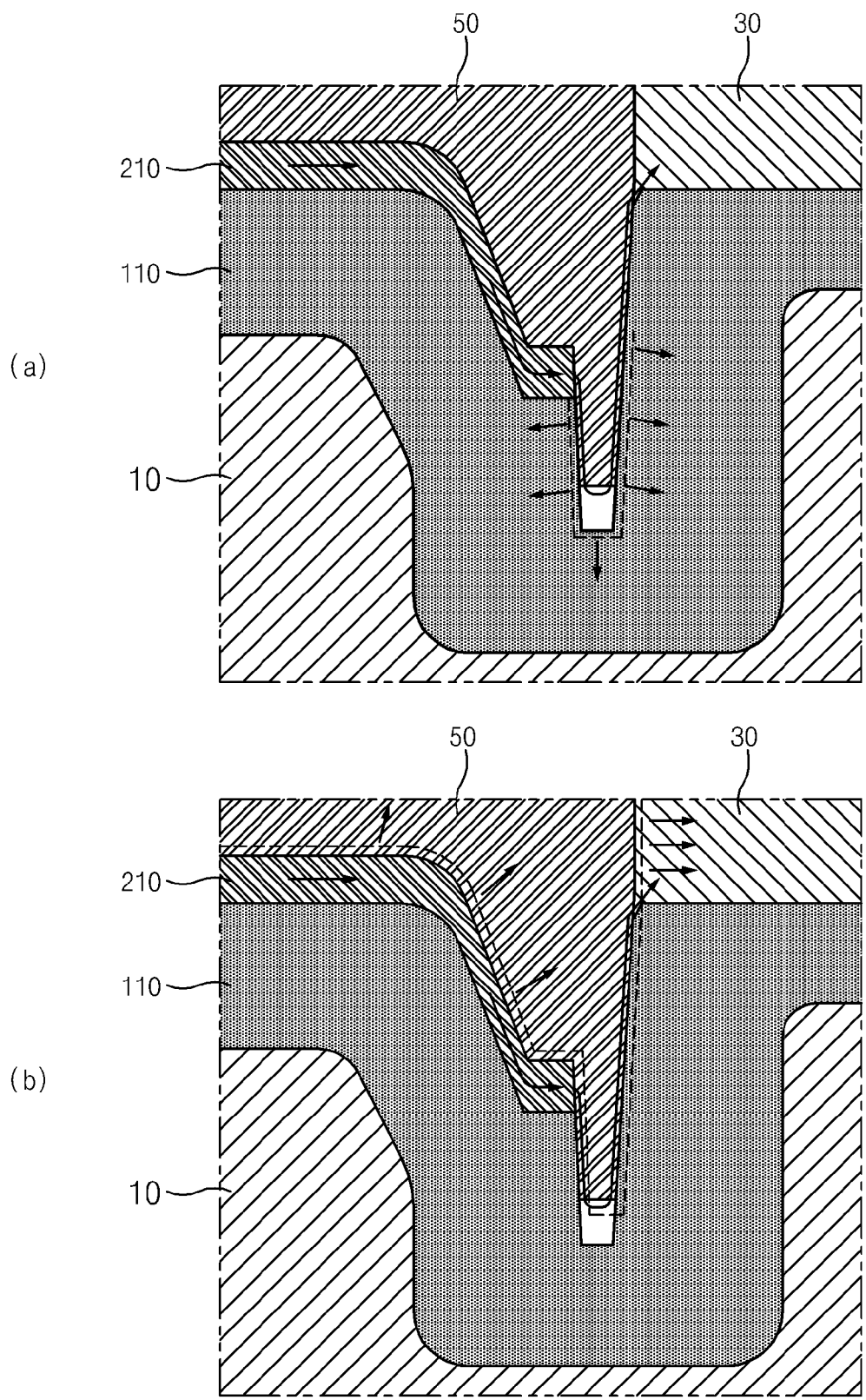
FIG. 3 is an enlarged view for enlarging "A" part of FIG. 1D for explaining a cause which an overflow occurs in the conventional localized over-molding die structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Now, a localized over-molding die structure according to an exemplary embodiment of the present invention will be explained in detail on the basis of the attaching drawings.

Figure 4:
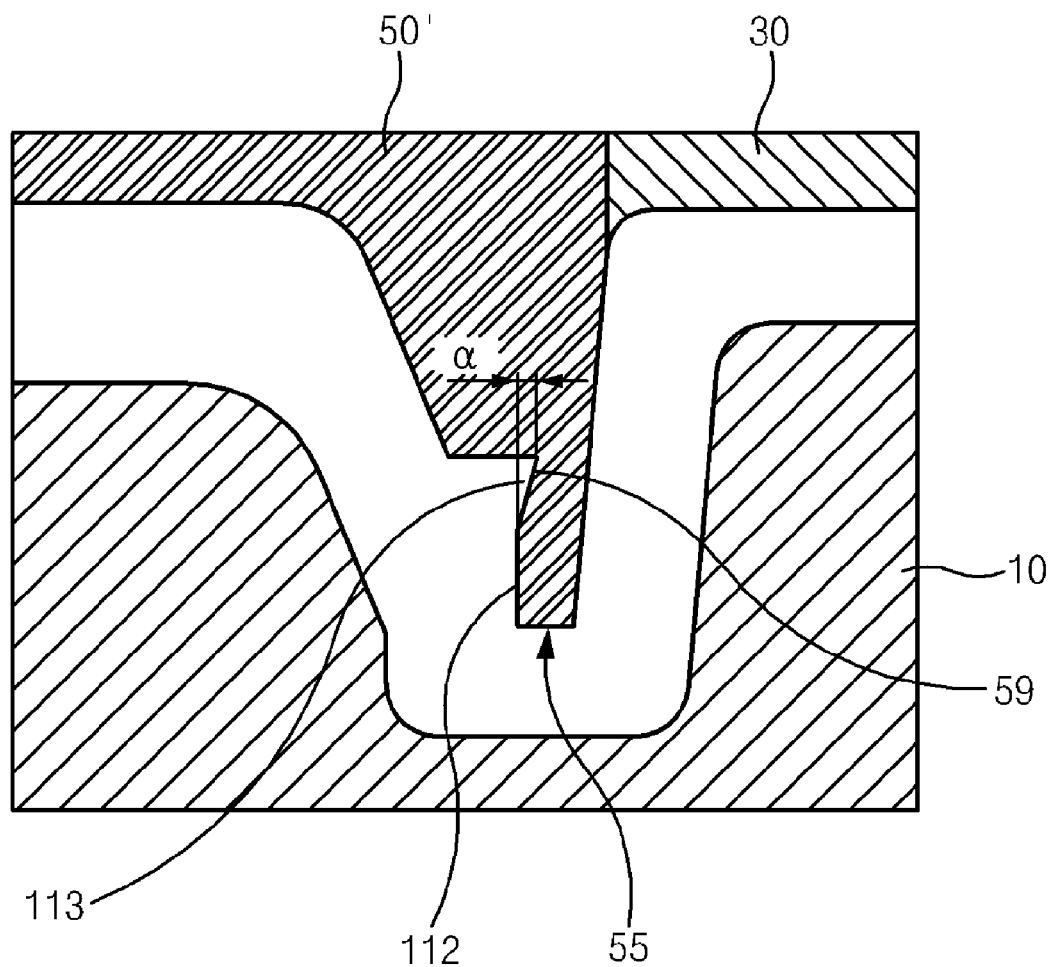
FIG. 4 is a section view illustrating an exemplary localized over-molding die structure according to the present invention.

FIG. 4 is a section view illustrating a localized over-molding die structure according to an exemplary embodiment of the present invention, and FIGS. 5A to 5D are section-views showing a injection molding process using a localized over-molding according to an exemplary embodiment of the present invention, respectively.

For reference, since the localized over-molding die structure according to an exemplary embodiment of the present invention is the same as the above-described localized over-molding die structure according to the prior art (Referring to FIG. 1A), only a part of the die structure is illustrated in FIG. 4 and FIGS. 5A to 5D.

Besides, in the die structure according to an exemplary embodiment of the present invention, like reference symbols of the same parts as the localized over-molding die structure according to the prior art indicate like elements.

As shown in FIG. 4, the localized over-molding die structure according to an exemplary embodiment of the present invention includes, a core die 10 arranged in a lower side, a cavity die 30 arranged in a upper side, and a slide die 50' for moving upward and downward in an inner space 35 of the cavity die 30, wherein the slide die 50' has a structure that an undercut 59 is formed on a step portion 55 which is formed on a lower bottom surface of the slide die 50'.

That is, the undercut 59 is a part which is recessed from a lower vertical surface 112 of the step portion 55 with a predetermined angle into the body of the step portion 55, and a corresponding part 113 of the first injection material 110 is formed in a shape of protruding into the undercut 59 and contacting thereto.

In the undercut 59, a maximal line length ($\alpha$) of the undercut in which the undercut is maximally recessed into the body of the step portion 55 of the slide die 50' may be 0.2 mm~0.4 mm.

A process of performing a molding in the localized over-molding die structure according to an exemplary embodiment of the present invention is shown in FIGS. 5A to 5D (here, the first gate 100 and the second gate 200 are not shown).

Referring to FIGS. 5A to 5D, by injecting a resin through the first gate (which is shown in reference symbol 100 of FIG. 1A), the first injection material 110' is formed. Here, the first injection material 110' is formed corresponding to the undercut 59 of the slide die 50', and an edge of the undercut corresponding part 113 of the first injection material 110' may be formed in a structure of protruding into the undercut 59 (referring to FIG. 5A).

Figure 5A:
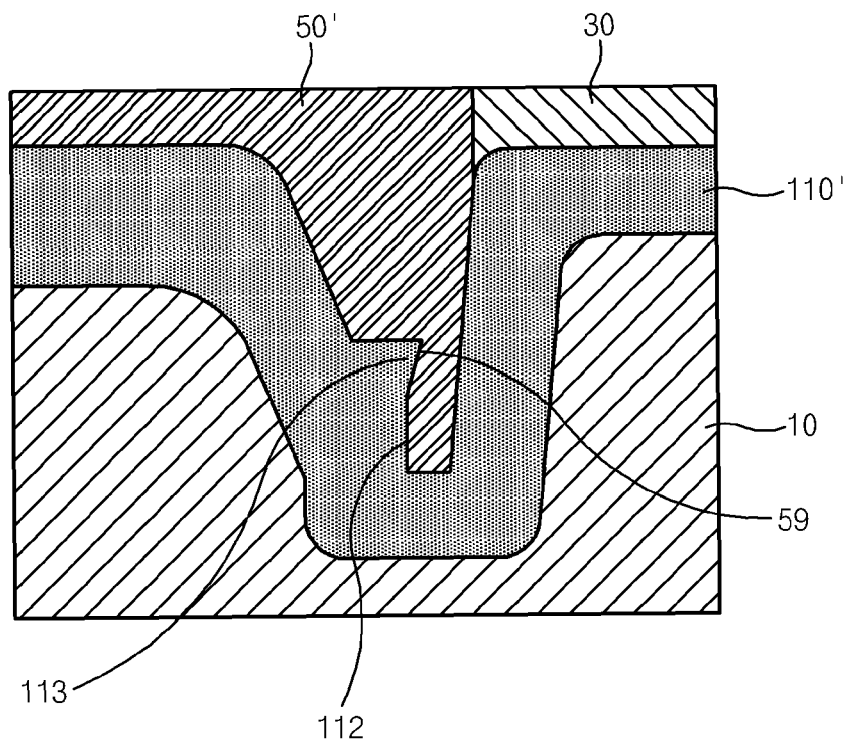
FIGS. 5A to 5D are section-views showing a localized over-molding process in an exemplary localized over-molding die structure according to the present invention, respectively.
Figure 5B:
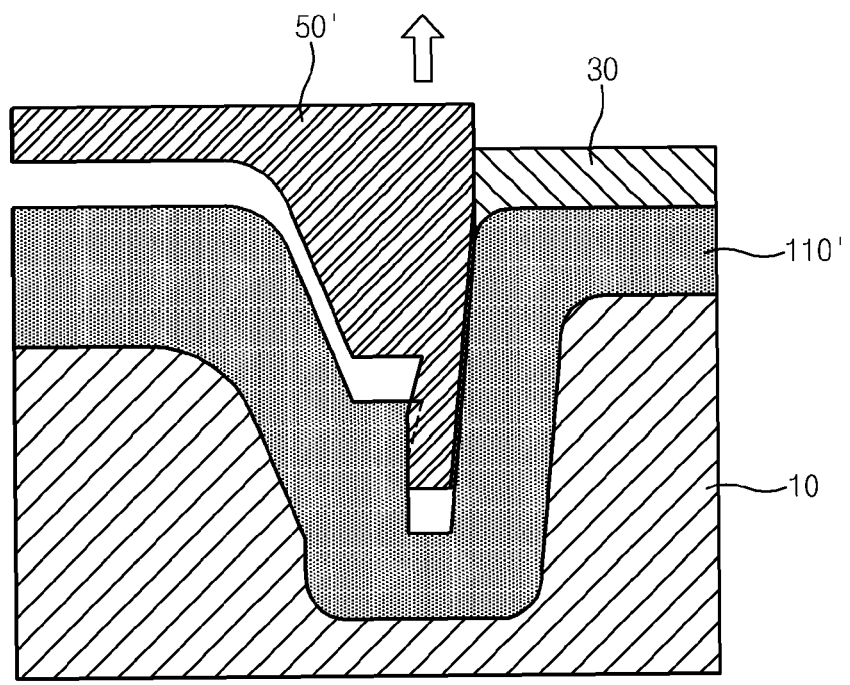
Figure 5C:
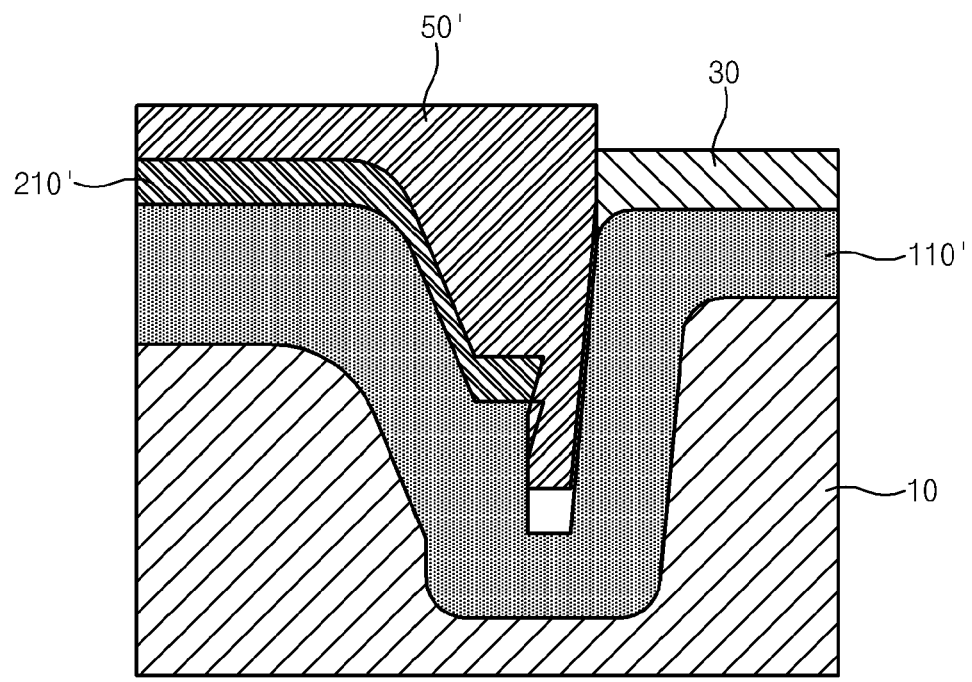

Next, after lifting up (in the arrow direction) the slide die 50' (referring to FIG. 5B), by injecting a resin through the second gate (which is shown in reference symbol 200 of FIG. 1A), the second injection material 210' may be formed on the upper side of the first injection material 110' (referring to FIG. 5C).

Figure 5D:
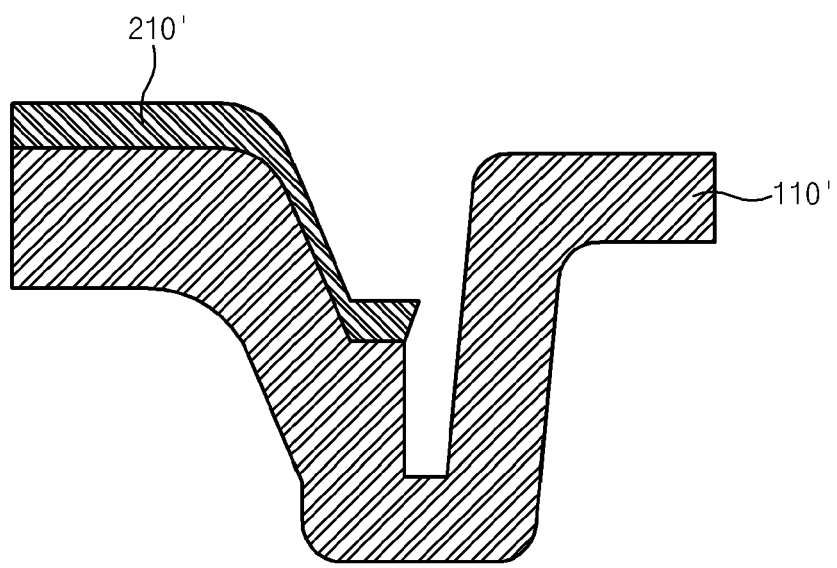

After this, the injection materials 110' and 210' which are formed as the above-described are separated from the localized over-molding die according to an exemplary embodiment of the present invention (referring to FIG. 5D).

As shown in FIG. 5D, according to the injection material structure acquired by the localized over-molding die structure of the present invention, it may be known that the overflow is not formed in the localized boundary of the two materials.

As the above-described, in the localized over-molding die structure according to an exemplary embodiment of the present invention, the reason why the overflow is not formed in the localized boundary of the two materials will be explained in detail as follows.

Figure 6:
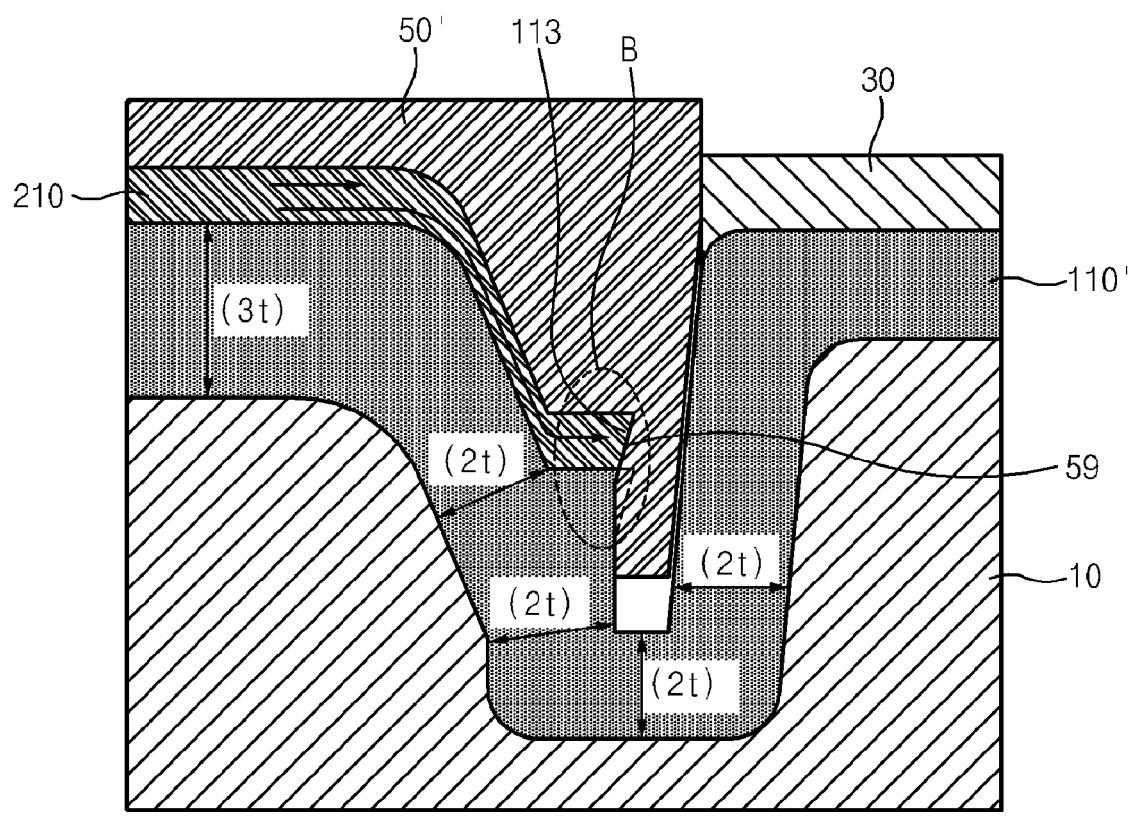
FIG. 6 is an enlarged view for enlarging FIG. 5C for explaining a principle which an overflow does not occur in an exemplary localized over-molding die structure according to the present invention.

FIG. 6 is a view for explaining a principle which an overflow does not occur in a localized over-molding die structure according to an exemplary embodiment of the present invention, that is, an enlarged view of FIG. 5C.

Figure 7:
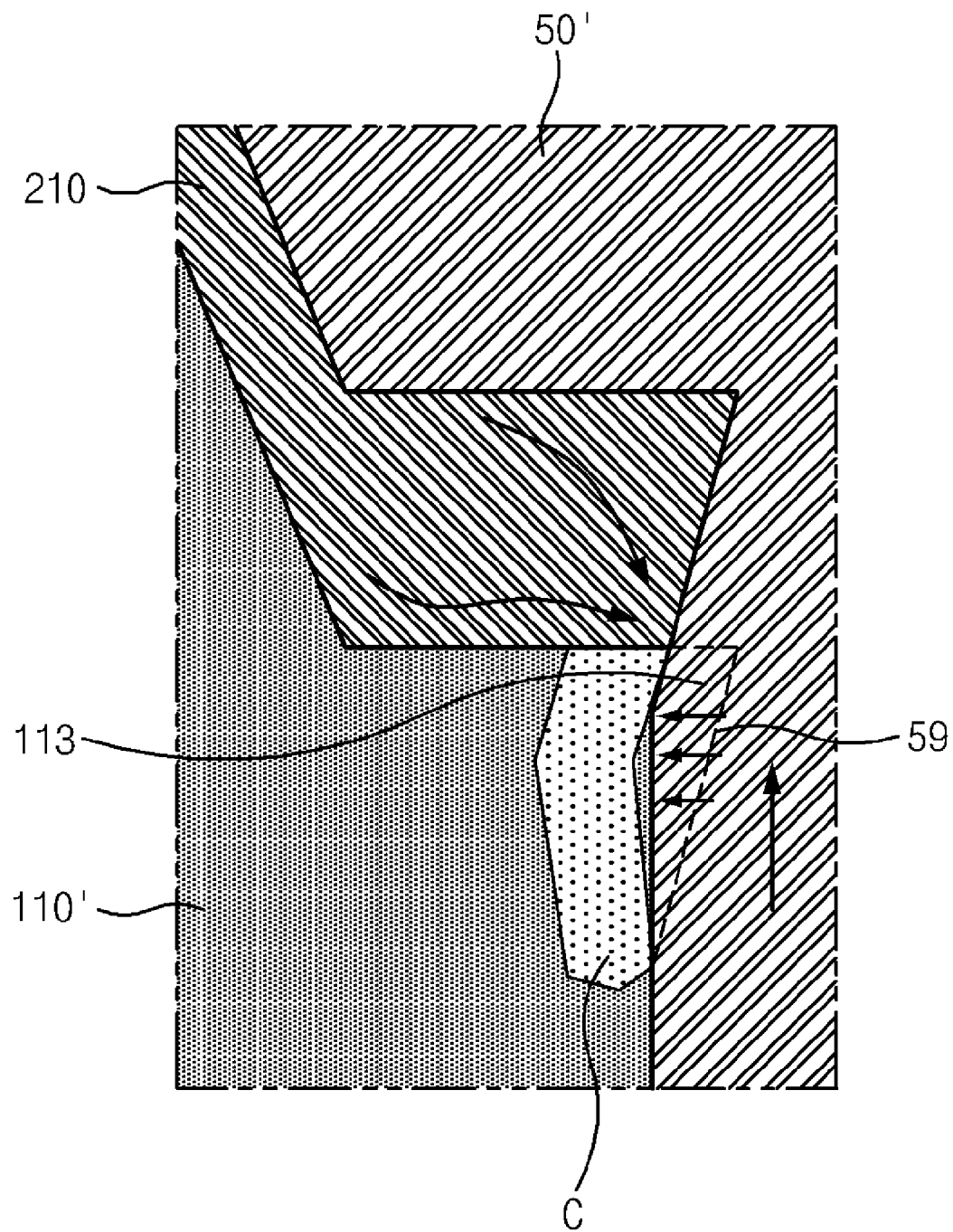
FIG. 7 is an enlarged view for enlarging "B" part of FIG. 6.

FIG. 7 is an enlarged view for enlarging "B" part of FIG. 6.

In the localized over-molding die structure according to an exemplary embodiment of the present invention, by forming the undercut 59 at a lateral side of the step portion 55 of the slide die 50', when the slide die 50' is receded upward for the second injection, a protruding part of the preformed first injection material 110' is formed, that is, the undercut corresponding part 113 of the first injection material 110' which corresponds to a position of the undercut 59 formed in the slide die 50' is formed. Also, the interference occurs between the undercut corresponding part 113 of the first injection material 110' and the slide die 50', and accordingly, a forced sealing area is formed in which the reciprocal shoving occurs by means of the interference.

When the slide die 50' is forcibly receded upward, the shoving by means of the interference is applied along an overlapped area between the slide die 50' and the undercut corresponding part 113 of the first injection material 110'.

On the other hand, since the preformed first injection material 10' is not completely cooled when the slide die 50' is receded forcibly and upward, it has no effect on a durability of the slide die 50' by means of the interference in the overlapped area.

Besides, the part C of FIG. 7 indicates an area in which a residual stress is formed, in case where the first injection material 110' is forcibly shoved due to the interference when the slide die 50' is receded.

As the above-described, in the localized over-molding die structure according to an exemplary embodiment of the present invention, by forming the undercut at the side on the step portion of the slide die, when the slide die for the second injection is receded, an adhesion is applied by the interference between the first injection material and the slide, and accordingly, it is possible to prevent from the overflow at the localized boundary of two materials.

For convenience in explanation and accurate definition in the appended claims, the terms "upper", "lower" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A localized over-molding die structure comprising:
   a core die;
   a cavity die having an inner space therein and placed onto an upper surface of the core die; and
   a slide die including a step portion on a lower surface along outer edge thereof and slidably engaged with the cavity die in the inner space thereof to move upward and downward,
   wherein, the step portion includes an undercut formed at a lateral side of said step portion such that when at least two materials are successively injected into the cavity die, a corresponding part to the undercut is formed to at least one of the at least two materials.

2. The localized over-molding die structure of claim 1, wherein the undercut is formed to be a shape which is recessed with a slanted angle from a lower vertical surface of the step portion.

3. The localized over-molding die structure of claim 2, wherein a maximal line length ($\alpha$) of the undercut is between approximately 0.2 mm and approximately 0.4 mm.

* * * * *